Feb. 10, 1948.                F. P. PLEVA                 2,435,654
                              TOOL HANDLE
                           Filed Oct. 24, 1944

INVENTOR.
FRANK P. PLEVA:
BY
Louis V. Lucia
ATTORNEY.

Patented Feb. 10, 1948

2,435,654

UNITED STATES PATENT OFFICE 2,435,654

TOOL HANDLE

Frank P. Pleva, Thompsonville, Conn.

Application October 24, 1944, Serial No. 560,094

4 Claims. (Cl. 279—102)

This invention relates to a tool handle and more particularly to a handle for files or other similar tools having an elongated shank to which the handle may be attached.

The primary object of this invention is to provide a tool handle which can be readily attached to or detached from a tool and which will remain firmly attached to the tool until it is desired to remove it therefrom.

A further object is to provide such a handle which is particularly adapted to be attached to a file by receiving therein the narrow shank of the file in such a manner that it will be firmly held until it is desired to release the same.

Further objects and advantages of the invention will be more clearly understood from the following description and from the accompanying drawings in which—

Figure 1:
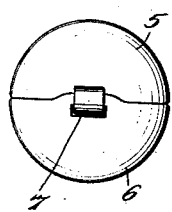
Fig. 1 is a rear end view, in elevation, of a tool handle embodying my invention.
Figure 2:
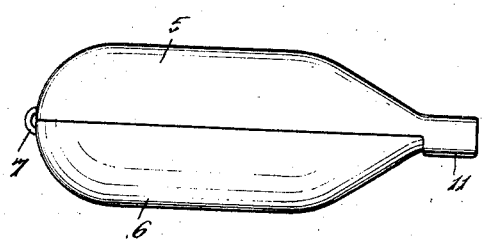
Fig. 2 is an elevational side view thereof.
Figure 3:
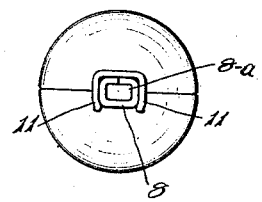
Fig. 3 is a front end view of the same in elevation.

As shown in the drawings, my improved handle comprises a shell constructed in two halves 5 and 6 which are hinged together, as at 7, and which, when closed, is in the shape of an elongated handle. The front portion of the half 6 is provided with a loop 8 having an opening 8a therein for receiving the shank 9 of a tool such as a file 10. The half 5 is provided with an inverted U-shaped portion having prongs 11—11 which are adapted to snap over the portion 7 and thereby retain the two halves 5 and 6 of the handle in closed position.

Figure 5:
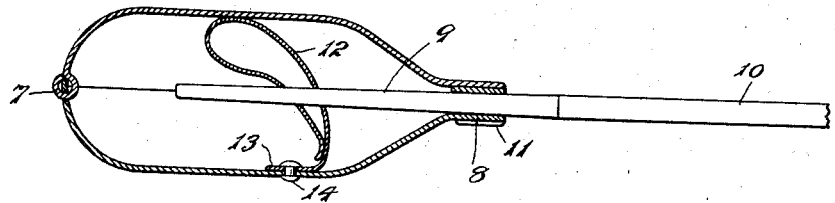
Fig. 5 is a similar view illustrating the handle as attached to the shank of a file.
Figure 6:
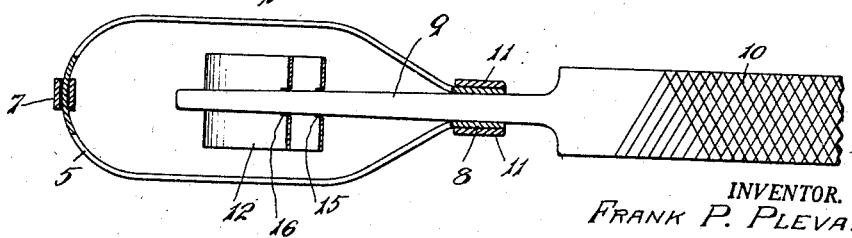
Fig. 6 is a bottom view in central horizontal section of the same.

A clamping spring 12 is provided within the handle and is in the form of a looped member having a foot portion 13, by which it is secured to the half 6 with a rivet 14, and openings 15 and 16 extending through the looped portion to receive the tool shank as clearly illustrated in Figs. 5 and 6. It will be noted that the said spring is inclined toward the rear, or hinged portion, of the handle.

Figure 4:
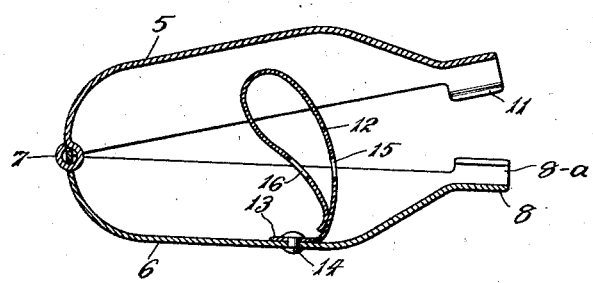
Fig. 4 is a view, in central vertical section, showing the handle in opened position.

The operation of my invention is as follows:

When it is desired to attach my improved handle to a tool, such as a file as shown in the embodiment illustrated, the handle is first opened, as in Fig. 4, and the shank 9 of the file is then inserted through the opening 8, in the portion 7 of the shell 6, and through the openings 15 and 16, in the spring 12, until the tapered sides of the shank 9 engage the sides of the opening 8. The handle is then closed, as shown in Fig. 5, until the prongs 11—11 have locked into engagement with the projection 7. This will cause the spring 12 to be forced downwardly and rearwardly at the same time, thus causing a binding action between the openings 15 and 16 and the surfaces of the shank 9 and simultaneously applying a pulling action on the shank which serves to draw the shank into the handle and further force it into tighter engagement with the sides of the opening 8 and thus securely retain the handle in the tool.

From the above, it will be understood that I have provided a simple and inexpensive tool handle which can be easily operated and which will firmly remain in engagement with a tool until it is desired to detach the same therefrom.

I claim:

1. A tool handle of the character described comprising a casing constructed of two halves hinged together at the rear of the handle, means at the front of the handle for receiving the shank of a tool, and a looped spring member secured to one of said halves and having openings for receiving a shank of a tool inserted into said handle; the said spring means being adapted, upon the closing of said handle, to clamp onto the shank and draw said shank inwardly into the handle.

2. A tool handle comprising a hollow shell constructed of two halves hinged together at the rear of the handle, one of said halves having an opening in the front portion thereof, and a looped spring member secured to said half and having openings therein substantially in alignment with the opening in the front of the half, the other of said halves being adapted, upon closing the same, to force said spring downwardly and rearwardly and thus acting to clamp the spring onto the shank of a tool inserted in said handle and draw said shank inwardly into the handle.

3. A tool handle of the character described comprising a shell composed of two halves hinged together at the rear portion of the handle, one of said halves having the front portion thereof formed to provide an opening on the surface of said handle, the other half having the front portion thereof formed to provide a U shape with prongs adapted to engage the exterior of the said portion of the other half for retaining the handle in closed position, and spring means within said handle adapted to be operated, upon closing of the two halves, to draw a shank inserted into said handle rearwardly into the handle and retain the same in engagement with the handle.

4. A tool handle comprising a hollow member constructed of two halves hinged together, clamping means within said handle for retaining the handle in engagement with a tool, and means for retaining said halves in closed position; the said clamping means comprising a spring member formed of a resilient strip of sheet material and having a foot portion secured to one of said halves of the handle, a portion extending outwardly from said foot portion, and a front portion bent towards said foot portion and into engagement with the said outwardly extending portion; the said outwardly extending portion and front portion having apertures therethrough substantially in alignment and the said spring member being inclined towards the rear of the handle and adapted to be engaged by the other half of the handle whereby, upon the closing of the handle, the other half will force said spring member rearwardly and slightly downwardly, causing the same to bind upon the shank of a tool inserted through said opening in the spring member and thereby retaining said handle securely on the tool.

FRANK P. PLEVA.

REFERENCES CITED

The following references are of record in the file of this patent:

UNITED STATES PATENTS

| Number | Name | Date |
|---|---|---|
| 483,865 | Potter et al. | Oct. 4, 1892 |
| 526,290 | Buckland | Sept. 18, 1894 |
| 1,436,556 | Woodworth | Nov. 21, 1922 |
| 2,228,053 | Guttmann | Jan. 7, 1941 |

FOREIGN PATENTS

| Number | Country | Date |
|---|---|---|
| 555,019 | France | 1923 |